C. G. HERRICK.
SPECTACLE CABINET.
APPLICATION FILED AUG. 21, 1916.

1,284,103.

Patented Nov. 5, 1918.
2 SHEETS—SHEET 2.

Witness:
C E Burnap

Inventor:
Charles G. Herrick
By Sheridan Wilkinson & Scott, Att'ys

UNITED STATES PATENT OFFICE.

CHARLES G. HERRICK, OF INDEPENDENCE, IOWA.

SPECTACLE-CABINET.

1,284,103.　　　　Specification of Letters Patent.　　Patented Nov. 5, 1918.

Application filed August 21, 1916.　Serial No. 116,024.

*To all whom it may concern:*

Be it known that I, CHARLES G. HERRICK, a citizen of the United States, residing at Independence, in the county of Buchanan and State of Iowa, have invented certain new and useful Improvements in Spectacle-Cabinets, of which the following is a specification.

This invention relates to cabinets or show cases for spectacles or eye-glasses, and its purpose is to provide an improved exhibiting and testing device for eye-glasses whereby a plurality of eye-glasses may be examined conveniently and quickly for the purpose of selecting the pair of eye-glasses most suitable for the eyes of the person making the examination. This device is adapted for use in jewelry stores, optical parlors, or other places where it is the common practice for customers or patients to select eye-glasses by testing a number of pairs until one is found which appears most suitable. I have therefore provided an exhibiting device which is adapted to hold a plurality of pairs of eye-glasses, and which may be manipulated to pass the eye-glasses successively into the line of vision of the person making the examination, so that the effect of each pair of eye-glasses may be determined by noting the effect thereof upon the operator's ability to read a card or sign disposed in the line of vision. A further object of the invention is the provision of a spectacle holder or cabinet which is rotatably mounted upon a base, being provided with means for holding a plurality of pairs of eye-glasses in such a manner that the rotation of the holder will bring the pairs of eye-glasses into position successively opposite a vision guide or goggle, through which a person may look for the purpose of determining the effect of each pair of eye-glasses upon his ability to read a card or sign placed within the holder. Another object is to provide a spectacle holder having vertically movable parts which will permit any selected class of eye-glasses to be examined separately from the other eye-glasses in the cabinet. A further object is to provide a spectacle cabinet having a plurality of adjustments for permitting the successive examination of different pairs of eye-glasses.

These and other objects of the invention will appear more clearly from the following specification, taken in connection with the accompanying drawings, in which one embodiment of the invention is illustrated.

In the drawings—

Figure 1:
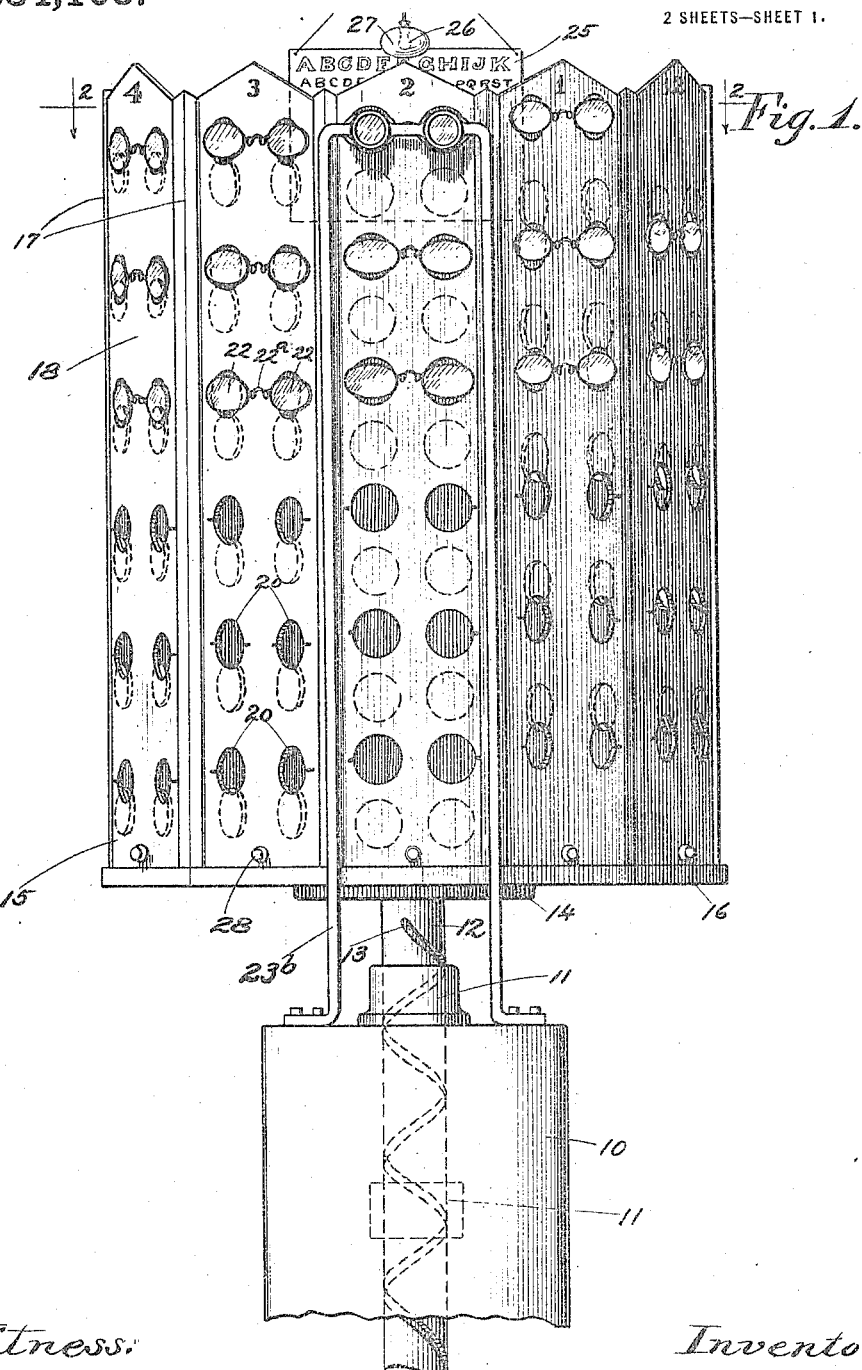
Figure 1 shows a side elevation of my improved eye-glass holder or spectacle cabinet.

By referring to the accompanying drawings, it will be seen that the exhibiting device or cabinet is shown as mounted upon a suitable support or base 10 having secured thereto one or more internally threaded nuts or collars 11, which are engaged by the shaft or spindle 12, having a relatively coarse thread 13 which engages the nut and causes the shaft to move vertically with respect to the support when it is rotated. This shaft is provided at its upper end with a flange 14, upon which is mounted the cabinet or eye-glass holder 15.

Figure 2:
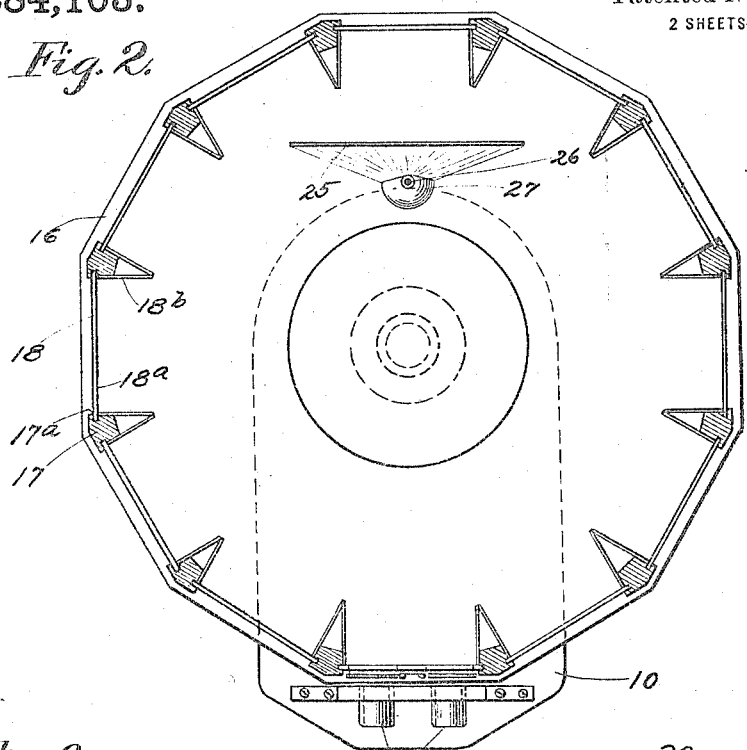
Fig. 2 is a sectional view, taken on the line 2—2 of Fig. 1.
Figure 3:
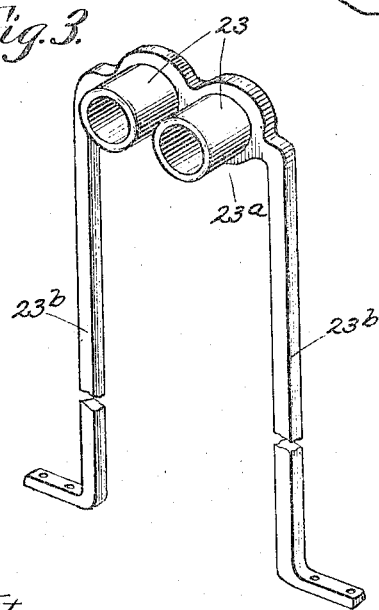
Fig. 3 is a perspective view of a vision guide, or modified form of goggle, through which the operator looks when examining the eye-glasses.

The cabinet comprises a base plate 16, which is secured to the flange 14, and which has secured thereto and extending vertically therefrom a plurality of guide members 17, which are spaced apart equal distances and located at the vertices of the sides of a polygon, as clearly shown in Fig. 2. These guide members are provided with grooves or guides 17$^a$, in which are mounted the vertically slidable holders 18, each of which comprises a plate 18$^a$ and two transversely disposed inwardly directed flanges or shields 18$^b$. These holders are mounted in the guides 17$^a$, whereupon the plates 18$^a$ thereof form the sides of a polygon, as clearly shown in Fig. 2, and the flanges 18$^b$, being directed inwardly, are arranged so that those of one holder substantially meet the flanges of the adjacent holders.

Figure 4:
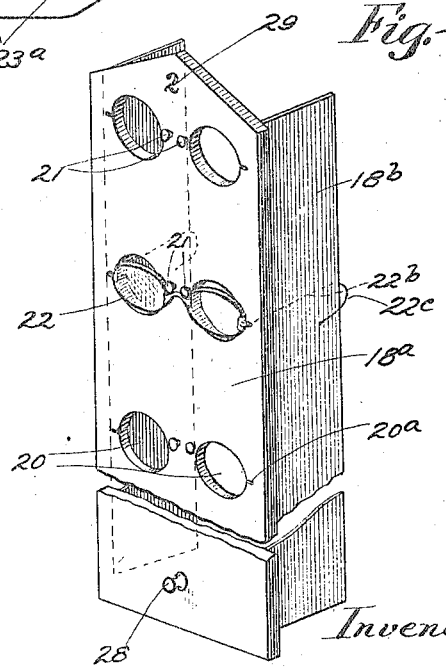
Fig. 4 is an enlarged perspective view of one of the vertically movable eye-glass supports.

The holders 18 thus form a complete closure for the sides of the cabinet. Each plate 18$^a$ of each holder is provided with a plurality of pairs of apertures 20, these pairs of apertures being spaced apart vertically, and the apertures of each pair being spaced apart horizontally a distance corresponding to the average distance between the eye-glasses of a pair of spectacles. A pair of hooks or pins 21 project from each holder between each pair of apertures, and they are adapted to engage the bridges 22$^a$ of the eye-glasses 22 in order to support the latter in positions opposite the respective apertures 20. Horizontally extending slots or notches 20ª are formed in the plates 18ª communicating with each of the apertures 20 at the outer sides thereof; these slots are adapted to receive the bows 22ᵇ, of spectacles which are provided therewith, and the curved extremities 22ᶜ of the bows are then hooked around the edges of the flanges 18ᵇ as shown, for instance, in Fig. 4, so that the spectacles are held securely in position. The pairs of apertures 20 are further arranged so that those of one holder are staggered with respect to those of the adjacent holders, and the apertures of all of the holders are arranged in this manner so that the successive pairs of apertures are located in the form of a spiral extending around the cabinet continuously from the bottom to the top thereof. In this way the cabinet may be rotated as permitted by the shaft 12 and nuts 11, so that each pair of apertures and a corresponding pair of eye-glasses may be brought in turn into position opposite the vision guide or goggles 23, which are in the form of two open sleeves 23ª carried by the arms 23ᵇ attached to the base 10 and projecting upwardly therefrom. The sleeves of the vision guide are spaced apart a distance equal to the distance between the apertures of each pair, so that a person looking through the guide 23 will look also through a pair of spectacles located opposite thereto, and may then test the effect of the pair of spectacles by noting the effect thereof on his ability to read a sign or test card 25 of usual form having letters of different size printed thereon, which is suspended within the cabinet and preferably illuminated by means of a suspended light 26, having a reflector 27 which directs the light upon the sign and shields it from the eyes of the person testing the eye-glasses. It will be seen that the vision guide or goggles 23 is located normally in a position opposite one of the pairs of apertures at the upper part of the cabinet, and after the operator has tested this pair of eye-glasses the cabinet may be manually rotated by engaging the projecting flange of the plate 16, for instance, whereupon the various pairs of eye-glasses arranged in the form of a spiral will be brought successively into a position opposite the vision guide, so that each pair may be tested. In this way a very large number of eye-glasses may be tested conveniently and very quickly by a person who possesses no particular skill in the testing of eye-glasses.

During this operation of testing, the eyes of the operator will be shielded from the light coming in through the apertures 20, other than the particular apertures through which he is looking, by means of the flanges or shields 18ᵇ, and his eyes will be shielded from the light of the lamp 26 by the reflector 27. If the operator desires to test all of the eye-glasses in a single vertical row without testing those in the other vertical rows, or without rotating the cabinet, this may be conveniently done by grasping one of the handles 28 on the desired one of the holders and sliding this holder vertically in the guides 17ª, thus passing the various pairs of eye-glasses in this row successively into a position opposite the vision guide. This may be of advantage, for instance, where the eye-glasses in a vertical row are fitted with lenses of a particular class or manufacture. Since each of the holders 18 differs from each one of the other holders 18 in the location of the apertures 20, it may be desirable to mark each of the holders with a suitable numeral, as indicated at 29, so that the holders after being removed may be re-assembled in the guides in proper position for the apertures to form a spiral extending around the cabinet.

In addition to the advantage of convenient and speedy manipulation for testing the optical qualities of eye-glasses, this device has the advantage that it permits a person to examine the mechanical and artistic qualities of the various eye-glasses from a single position adjacent the cabinet.

Although I have shown and described a particular embodiment of the invention for purposes of illustration, it will be understood that it may be constructed in various other forms without departing from the scope of my invention as defined in the appended claims.

I claim:—

1. In a device of the class described, means for holding and exhibiting an eye-glass, a vision guide, and means for supporting said holding means and for moving the same spirally upward to position said eye-glass opposite said vision guide.

2. In a device of the class described, means for holding a plurality of eye-glasses in spiral formation, a vision guide, and means whereby the rotation of said holding means causes said eye-glasses to move in succession to a position opposite said guide.

3. In a device of the class described, a holder having means arranged in spiral formation thereon for holding eye-glasses, a vision guide adjacent said holder, and means whereby the rotation of said holder positions each pair of eye-glasses successively opposite said vision guide.

4. In a device of the class described, a vision guide, and a holder for a plurality of eye-glasses, said holder having a spiral adjustment for moving said eye-glasses into position opposite said vision guide.

5. In a device of the class described, a vision guide, a cabinet having a plurality of holders slidably mounted in the outer wall thereof, each of said holders being provided with a pair of apertures, the pairs of apertures in adjacent holders being arranged in the form of a spiral around said cabinet, said holders being movable vertically to position the eye-glasses held thereby opposite said vision guide, and means whereby the rotation of said cabinet positions the eye-glasses held by adjacent holders successively opposite said vision guide.

6. In a device of the class described, a supporting base, a screw-threaded shaft mounted on said base to move longitudinally with respect to said base when rotated, an eye-glass holder mounted on the end of said shaft, means for supporting eye-glasses in the form of a spiral around said holder, and a vision guide mounted in fixed position adjacent said holder and aranged to aline successively with each pair of eye-glasses when said holder is rotated.

7. In a device of the class described, a cabinet having a plurality of sides arranged in the form of a regular polygon, said sides being provided with a plurality of apertures arranged in pairs, means adjacent each pair of apertures for supporting a pair of eye-glasses in registry with said apertures, said pairs of apertures being arranged in the form of a spiral extending around said cabinet, a vision guide comprising two apertured members adapted to register with a pair of apertures in said cabinet, a card mounted in said cabinet opposite said vision guide, and means comprising a screw-threaded spindle for supporting said cabinet and moving the same vertically when it is rotated.

8. In a device of the class described, a rotatable cabinet, a plurality of pairs of apertures provided in the walls of said cabinet in vertically spaced-apart relations, a stationary vision guide, and means whereby the rotation of said cabinet operates to position any desired pair of said apertures opposite said guide.

9. In a device of the class described, a vision guide, a cabinet having a plurality of slidable holders, each of said holders being provided with a plurality of pairs of apertures, the pairs of apertures in adjacent holders being arranged in the form of a spiral around said cabinet, and means whereby the rotation of said cabinet operates to raise and lower the same, whereby any desired pair of said apertures may be brought into alinement with said vision guide by sliding said holders or by rotating said cabinet.

10. In a device of the class described, a cabinet having a plurality of vertically disposed panels, vertically spaced-apart pairs of apertures therein, eye-glasses supported in registry with said apertures, a vision guide and means for moving said cabinet to position any desired pair of said apertures opposite said guide.

11. In a device of the class described, a rotatable cabinet having a base plate and a plurality of side panels extending upwardly therefrom, a plurality of spaced apart pairs of apertures provided in said panels, a stationary vision guide, and means whereby the rotation of said cabinet operates to position any desired pair of said apertures opposite said guide.

In testimony whereof, I have subscribed my name.

CHARLES G. HERRICK.

Copies of this patent may be obtained for five cents each, by addressing the "Commissioner of Patents, Washington, D. C."